US011813997B2

(12) United States Patent
Lee (10) Patent No.: US 11,813,997 B2
(45) Date of Patent: Nov. 14, 2023

(54) AIRBAG DEPLOYMENT APPARATUS AND METHOD

(71) Applicant: HYUNDAI MOBIS CO., LTD., Seoul (KR)

(72) Inventor: Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 63 days.

(21) Appl. No.: 17/525,825

(22) Filed: Nov. 12, 2021

(65) Prior Publication Data

US 2022/0194310 A1 Jun. 23, 2022

(30) Foreign Application Priority Data

Dec. 18, 2020 (KR) .......................... 10-2020-0178255

(51) Int. Cl.
*B60R 21/0136* (2006.01)
*B60R 21/207* (2006.01)

(52) U.S. Cl.
CPC ........ *B60R 21/0136* (2013.01); *B60R 21/207* (2013.01)

(58) Field of Classification Search
None
See application file for complete search history.

(56) References Cited

U.S. PATENT DOCUMENTS

| 7,881,865 | B2 * | 2/2011 | Ide ..................... G08G 1/161 |
| | | | 348/148 |
| 8,935,087 | B2 * | 1/2015 | Suzuki ............... B60R 21/0136 |
| | | | 701/300 |
| 9,663,053 | B2 * | 5/2017 | Saitoh ..................... B60R 19/18 |
| 10,668,881 | B2 * | 6/2020 | Yoshida ............... B60R 19/483 |

(Continued)

FOREIGN PATENT DOCUMENTS

| DE | 10 2005 035 415 | 2/2007 | |
| DE | 10 2011 077 486 | 10/2012 | |
| DE | 11 2007 000 606 B4 * | 5/2015 | ......... B60R 21/0134 |

(Continued)

OTHER PUBLICATIONS

German Office Action dated Feb. 8, 2023 issued in DE 10 2021 133 601.5.

*Primary Examiner* — Faye M Fleming
(74) *Attorney, Agent, or Firm* — DLA PIPER LLP (US)

(57) ABSTRACT

An airbag deployment apparatus includes: an active sensor detecting information of a collision object to a vehicle; a pressure sensor detecting pressure applied to the vehicle during a collision of the vehicle; an inertia sensor detecting acceleration of the vehicle; a first collision determination part determining whether a vehicle collision occurs or not by information of the active sensor; a second collision determination part additionally determining whether a vehicle collision occurs or not by information of the pressure sensor and a result of the first collision determination part; a third collision determination part additionally determining (Continued)

whether a vehicle collision occurs or not by information of the inertia sensor and results of the first and second collision determination parts; and an airbag deployment determination part determining whether an airbag is deployed or not by a result of the third collision determination part.

19 Claims, 6 Drawing Sheets

(56) References Cited

U.S. PATENT DOCUMENTS 10,864,872 B2 * 12/2020 Sheldon ................ B60R 21/203

FOREIGN PATENT DOCUMENTS

| | | | |
|---|---|---|---|
| DE | 10 2016 213 074 | 1/2018 | |
| DE | 10 2016 226 040 | 6/2018 | |
| DE | 10 2016 226 047 | 6/2018 | |
| KR | 20100016982 A * | 2/2010 | ......... B60R 21/0136 |
| KR | 10-2048938 | 11/2019 | |
| WO | WO-2020174161 A1 * | 9/2020 | ............. B60R 19/48 |

* cited by examiner

AIRBAG DEPLOYMENT APPARATUS AND METHOD

CROSS REFERENCE TO RELATED APPLICATION

The present application claims priority to Korean Patent Application No. 10-2020-0178255, filed Dec. 18, 2020, the entire contents of which is incorporated herein for all purposes by this reference.

BACKGROUND OF THE INVENTION

Field of the Invention

The present invention relates to airbag deployment apparatus and method and, more particularly, to airbag deployment apparatus and method for a seat-mounted airbag provided for restricting the movement of an occupant and thus protecting the occupant during a vehicle collision to protect the occupant.

Description of the Related Art

In general, a vehicle is equipped with an airbag that can safely protect occupants by restricting movement of the occupants during a vehicle collision.

A conventional airbag is provided on a front structure of a driver seat or a passenger seat and is configured to be deployed in a direction opposite to a direction of an occupant to be moved. However, the conventional airbag is provided at a portion facing the occupant and is deployed in the direction opposite to the occupant moving direction, so that the airbag aggravates occupant injuries when the airbag is deployed prematurely or deployment thereof is delayed.

In order to solve the problem of the front-installation airbag, a seat-mounted airbag mounted in a side portion of a vehicle seat and deployed in a direction same as the occupant moving direction during a vehicle collision may be used.

In the seat-mounted airbag, the airbag should be deployed in consideration to a distance that the occupant moves forward in order to locate a front chamber of the airbag deployed from the seat in front of the occupant, so reduction of the deployment time of the airbag is important.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to airbag deployment apparatus and method capable of reducing deployment time of a seat-mounted airbag and of preventing m is-deployment by using various sensors and properly adjusting threshold values used to determine whether the airbag is deployed or not.

In order to achieve the above objective, according to one aspect of the present invention, there is provided an airbag deployment apparatus including: an active sensor configured to detect at least one type of information among a distance, a speed, a position, and a type of a collision object to a vehicle; a pressure sensor configured to detect pressure applied to the vehicle during a collision of the vehicle; an inertia sensor configured to detect acceleration of the vehicle; a first collision determination part configured to determine whether a vehicle collision occurs or not on the basis of information detected by the active sensor; a second collision determination part configured to additionally determine whether a vehicle collision occurs or not on the basis of pressure information detected by the pressure sensor and a collision determination result performed by the first collision determination part; a third collision determination part configured to additionally determine whether a vehicle collision occurs or not on the basis of acceleration information of the vehicle detected by the inertia sensor and collision determination results performed by both the first collision determination part and the second collision determination part; and an airbag deployment determination part configured to determine whether an airbag is deployed or not on the basis of a collision determination result performed by the third collision determination part.

In the embodiment of the present invention, the first collision determination part may be configured to receive a relative distance, a relative speed, and a relative position between the collision object and the vehicle, and the type of the collision object, which may be detected by the active sensor, and to determine whether the vehicle collides with the collision object or not on the basis of the speed and acceleration/deceleration information of the vehicle.

In the embodiment of the present invention, the second collision determination part may be configured to create accumulative pressure-pressure metrics on the basis of the information detected by the pressure sensor, and when the first collision determination part determines that the vehicle does not collide, the second collision determination part may determine whether a vehicle collision occurs or not on the basis of a result obtained by comparing a preset first threshold and the accumulative pressure-pressure metrics, and when the first collision determination part determines that the vehicle collides, the second collision determination part may determine whether a vehicle collision occurs or not on the basis of a result obtained by comparing a second threshold less than the first threshold and the accumulative pressure-pressure metrics.

In the embodiment of the present invention, the third collision determination part may be configured to create distance-speed metrics on the basis of the information detected by the inertia sensor, and to determine whether a vehicle collision occurs or not by comparing the distance-speed metrics to a preset threshold, and to change the preset threshold used in the collision determination on the basis of the collision determination results of both the first collision determination part and the second collision determination part.

In the embodiment of the present invention, when the collision determination results of the first collision determination part and the second collision determination part are not present, the third collision determination part may determine whether a vehicle collision occurs or not by comparing accumulative pressure-pressure metrics and a third threshold, when the first collision determination part determines that a vehicle collision occurs and the second collision determination part determines that a vehicle collision does not occur, the third collision determination part may determine whether a vehicle collision occurs or not by comparing a fourth threshold less than the third threshold and the accumulative pressure-pressure metrics, when the first collision determination part determines that a vehicle collision does not occur and the second collision determination part determines that a vehicle collision occurs, the third collision determination part may determine whether a vehicle collision occurs or not by comparing a fifth threshold less than the fourth threshold and the accumulative pressure-pressure metrics, and when both the first collision determination part and the second collision determination part determine that a vehicle collision occurs, the third collision determination part may determine whether a vehicle collision occurs or not by comparing a sixth threshold less than the fifth threshold and the accumulative pressure-pressure metrics.

In the embodiment of the present invention, the airbag may be a seat-mounted airbag provided at a seat of the vehicle and configured to be deployed forward from a rear side of an occupant on the seat.

The airbag deployment apparatus of the embodiment of the present invention may include: a front airbag provided in front of the seat and configured to be deployed from the front of the occupant on the seat toward the occupant; and a seat position sensor configured to detect a distance between an installation position of the front airbag and the seat.

In the embodiment of the present invention, when a position of the seat is located close to the installation position of the front airbag to be shorter than a preset seventh threshold, the airbag deployment determination part may not deploy the seat-mounted airbag.

In the embodiment of the present invention, when the position of the seat is spaced apart from the installation position of the front airbag by a distance equal to or longer than the preset seventh threshold and is closer thereto to be shorter than an eighth threshold greater than the seventh threshold, the airbag deployment determination part may deploy the seat-mounted airbag first and then deploy the front airbag with time of delay.

In the embodiment of the present invention, when the seat position is spaced apart from the installation position of the front airbag by a distance equal to longer than the eighth threshold, the airbag deployment determination part may deploy the seat-mounted airbag and the front airbag, separately.

In order to achieve the above objective, according to another aspect of the present invention, there is provided an airbag deployment method including: inputting information from an active sensor configured to detect at least one type of information among a distance, a speed, a position, and a type of a collision object to a vehicle, information from a pressure sensor configured to detect pressure applied to the vehicle during a vehicle collision, and information from an inertia sensor configured to detect acceleration of the vehicle; first collision-determining, wherein a first collision determination part determines whether a vehicle collision occurs or not on the basis of information detected by the active sensor; second collision-determining, wherein a second collision determination part additionally determines whether a vehicle collision occurs or not on the basis of pressure information detected by the pressure sensor and a collision determination result of the first collision determination part; third collision-determining, wherein a third collision determination part additionally determines whether a vehicle collision occurs or not on the basis of acceleration information detected by the inertia sensor, and collision determination results performed in both the first collision-determining and the second collision-determining; and determining, wherein an airbag deployment determination part determines whether an airbag is deployed or not on the basis of a collision determination result performed in the third collision-determining.

In the another embodiment of the present invention, in the first collision-determination, the first collision determination part may receive a relative distance, a relative speed, and a relative position between the collision object and the vehicle, and a type of the collision object, which are detected by the active sensor, and determine whether the vehicle collides with the collision object or not on the basis of the speed and acceleration/deceleration information of the vehicle.

in the second collision-determining, the first collision determination part may create accumulative pressure-pressure metrics on the basis of the information detected by the pressure sensor, and when the first collision determination part determines that a vehicle collision does not occur in the first collision-determining, the second collision determination part may determine whether a vehicle collision occurs or not on the basis of a result obtained by comparing a preset first threshold and the accumulative pressure-pressure metrics, and when the first collision determination part determines that a vehicle collision occurs in the first collision-determining, the second collision determination part may determine whether a vehicle collision occurs or not on the basis of a result obtained by comparing a second threshold less than the first threshold and the accumulative pressure-pressure metrics.

In the other embodiment of the present invention, in the third collision-determining, the third collision determination part may create distance-speed metrics on the basis of the information detected by the inertia sensor, and determine whether a vehicle collision occurs or not by comparing the distance-speed metrics to a preset threshold, and change the preset threshold used in the collision determination on the basis of the collision determination results of both the first collision determination part and the second collision determination part.

In the other embodiment of the present invention, in the third collision-determining, when the collision determination results in the first collision-determining and the second collision-determining are not present, the third collision determination part may determine whether a vehicle collision occurs or not by comparing the accumulative pressure-pressure metrics and a third threshold, when the first collision determination part determines that a vehicle collision occurs in the first collision-determining and the second collision determination part determines that a vehicle collision does not occur in the second collision-determining, the third collision determination part may determine whether a vehicle collision occurs or not by comparing a fourth threshold less than the third threshold and the accumulative pressure-pressure metrics, when the first collision determination part determines that a vehicle collision does not occur in the first collision-determining and the second collision determination part determines that a vehicle collision occurs in the second collision-determining, the third collision determination part may determine whether a vehicle collision occurs or not by comparing a fifth threshold less than the fourth threshold and the accumulative pressure-pressure metrics, and when both the first collision determination part and the second collision determination part determine that a vehicle collision occurs in the first collision-determining and the second collision-determining, the third collision determination part may determine whether a vehicle collision occurs or not by comparing a sixth threshold less than the fifth threshold and the accumulative pressure-pressure metrics.

In the other embodiment of the present invention, the airbag may be a seat-mounted airbag provided at a seat of the vehicle and configured to be deployed forward from a rear side of an occupant on the seat.

In the other embodiment of the present invention, the vehicle may include: a front airbag provided in front of the seat and configured to be deployed from the front of the occupant on the seat toward the occupant; and a seat position sensor configured to detect a distance between an installation position of the front airbag and the seat, and in the determining of airbag deployment, when a position of the seat is closer to the installation position of the front airbag to be shorter than a preset seventh threshold, the airbag deployment determination part may determine not to deploy the seat-mounted airbag.

In the other embodiment of the present invention, in the determining of airbag deployment, when the position of the seat is spaced apart from the installation position of the front airbag by a distance equal to or longer than the present seventh threshold and is closer thereto an eighth threshold greater than the seventh threshold, the airbag deployment determination part may determine to deploy the seat-mounted airbag first and then to deploy the front airbag with time of delay.

In the other embodiment of the present invention, in the determining of airbag deployment, when the position of the seat is spaced apart from the installation position of the front airbag by a distance equal to or longer than the eighth threshold, the airbag deployment determination part may deploy both the seat-mounted airbag and the front airbag.

As described above, the airbag deployment apparatus and method can use the information detected by the various sensors that can detect whether a vehicle collision occurs or not in conjunction with each other to adjust the threshold values used in the collision determination. Therefore, rapid airbag deployment can be realized and at the same time m is-deployment of the airbag when the airbag deployment is not necessary can be prevented.

The airbag deployment apparatus and method can prevent interference between the seat-mounted airbag for protecting the occupant and the front airbag deployed from the front of the seat toward the occupant when the seat-mounted airbag and the front airbag are operated together.

Accordingly, the airbag deployment apparatus and method can efficiently protect the occupant during a vehicle collision and thus improve the safety of the occupant.

Effects of the present invention are not limited to the above-mentioned effects, and those skilled in the art will clearly understand other effects not mentioned in consideration of a following description.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, an airbag deployment apparatus and method according to various embodiments will be described in detail with reference to accompanying drawings.

Figure 1:
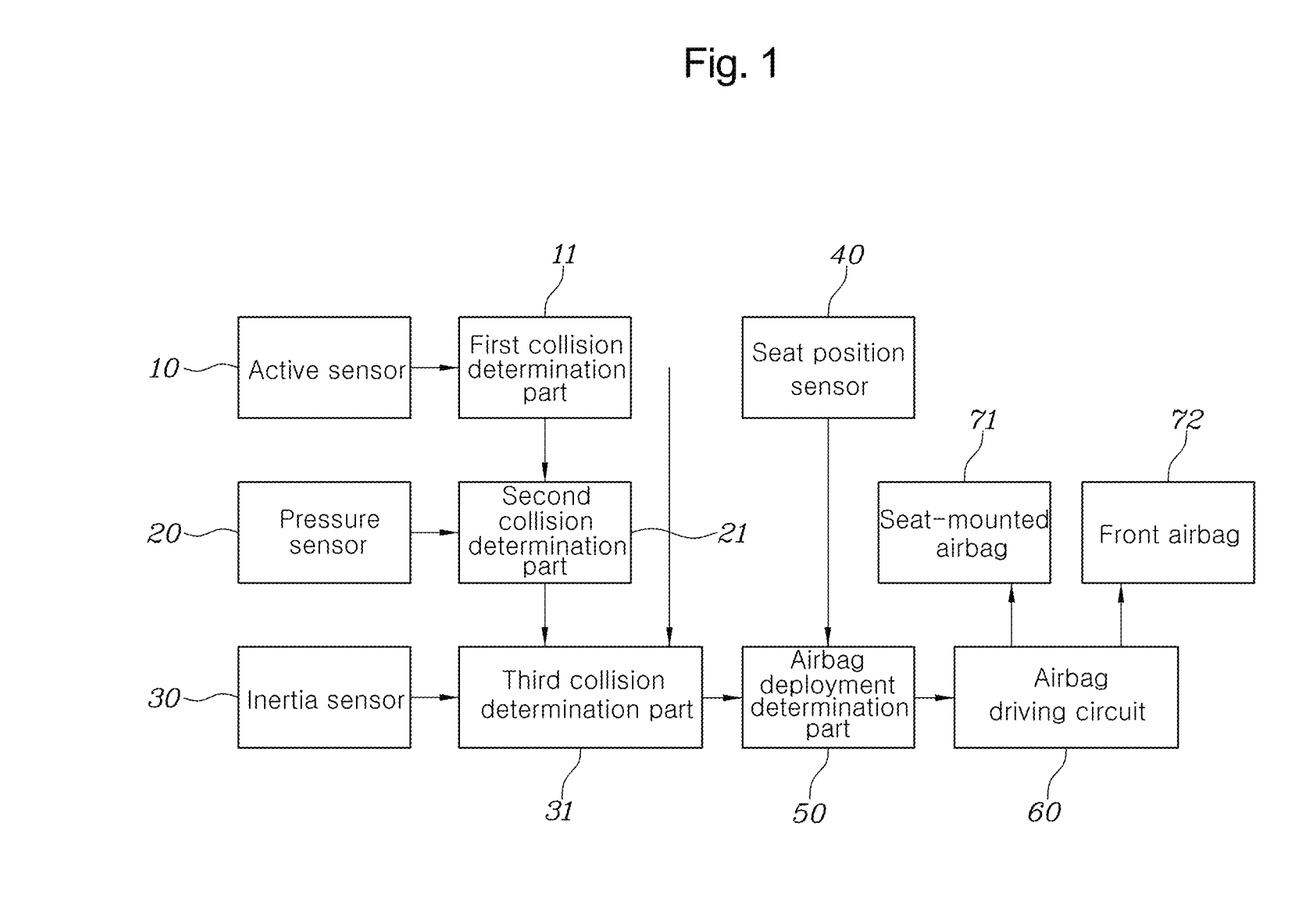
FIG. 1 is a block diagram showing the construction of an airbag deployment apparatus according to an embodiment of the present invention.

FIG. 1 is a block diagram showing an injury prediction system of a vehicle having an airbag deployment apparatus according to an embodiment of the present invention.

Referring to FIG. 1, the airbag deployment apparatus according to the embodiment of the present invention may include:

an active sensor 10 provided in a vehicle and configured to detect at least one type of information among a distance, a speed, a position, and a type of a collision object to the vehicle;

a pressure sensor 20 configured to detect pressure applied to the vehicle during a collision of the vehicle;

a first collision determination part 11 configured to determine whether a vehicle collision occurs or not on the basis of information detected by the active sensor 10;

a second collision determination part 21 configured to additionally determine whether a vehicle collision occurs or not on the basis of both the pressure information detected by the pressure sensor 20 and a collision determination result of the first collision determination part 11; an inertia sensor 30 configured to detect acceleration of the vehicle;

a third collision determination part 31 configured to additionally determine whether a vehicle collision occurs or not on the basis of acceleration information detected by the inertia sensor 30 and collision determination results performed by both the first collision determination part 11 and the second collision determination part 21; and an airbag deployment determination part 50 configured to determine whether an airbag is deployed or not on the basis of a collision determination result performed by the third collision determination part 31.

According to the embodiment of the present invention, the airbag deployment apparatus may include a seat position sensor 40 configured to detect a position of a seat equipped with the airbag. The airbag deployment determination part 50 may determine whether the airbag is deployed or not on the basis of a seat position detected by the seat position sensor 40.

Figure 2:
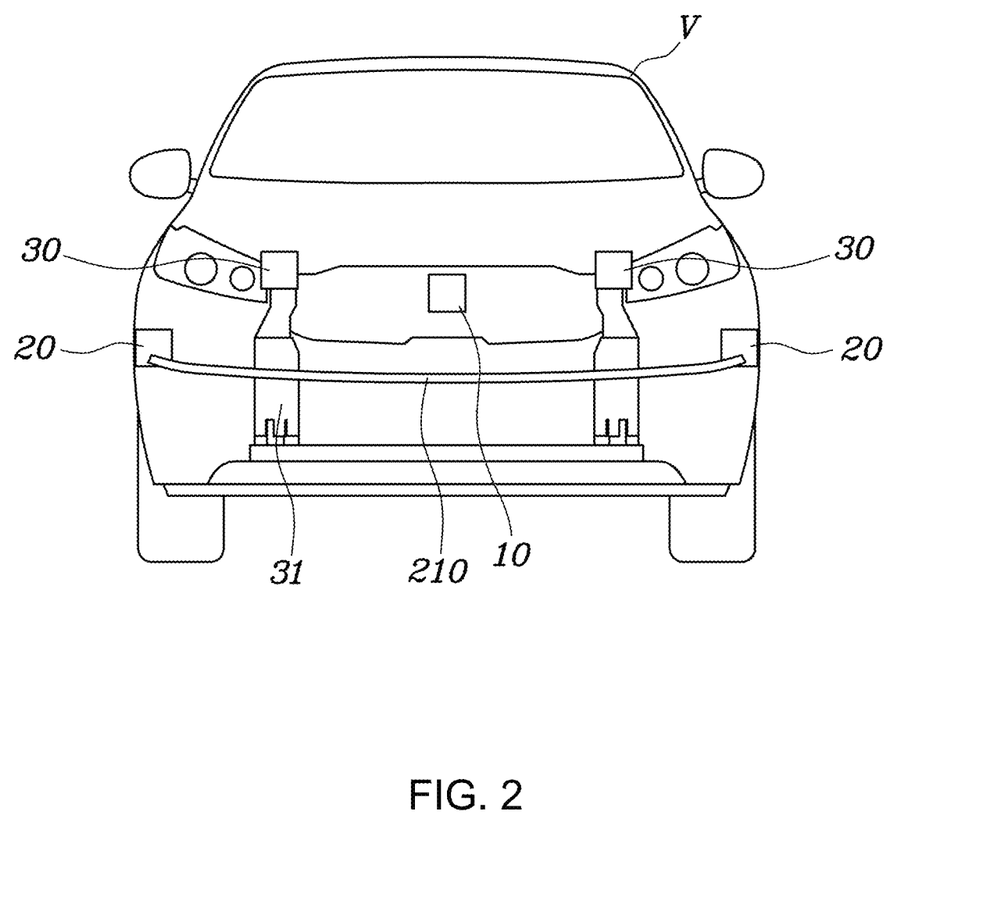
FIG. 2 is a view showing an installation example of various sensors provided in the airbag deployment apparatus according to the embodiment of the present invention.

FIG. 2 is a view showing an installation example of various sensors provided in the airbag deployment apparatus according to the embodiment of the present invention.

Referring to FIG. 2, the active sensor 10 is a sensor, such as a radar sensor or a camera, capable of determining a distance, a speed, a position, and a type of a collision object located in front of the vehicle.

The pressure sensor 20 is a sensor installed at a front end of the vehicle and detecting the amount of pressure applied to the vehicle when the vehicle collides. For example, the pressure sensor 20 may be provided at a front bumper of the vehicle V.

Figure 3:
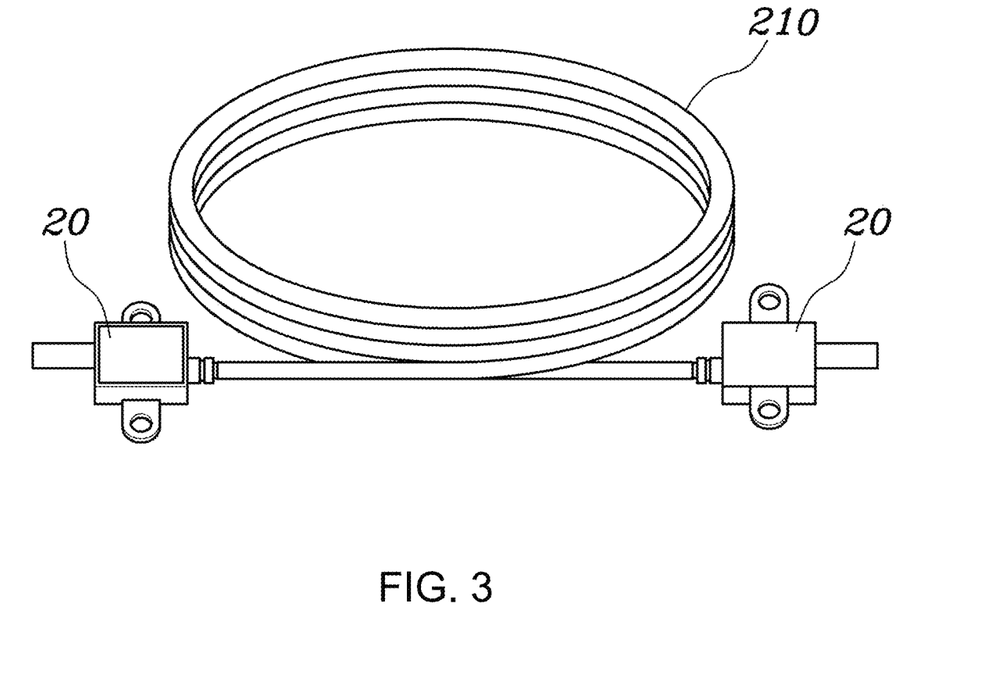
FIG. 3 is a view showing an example of a pressure sensor of the airbag deployment apparatus according to the embodiment of the present invention.

FIG. 3 is a view showing an example of the pressure sensor 20 of the airbag deployment apparatus according to the embodiment of the present invention.

As shown in FIG. 3, the pressure sensor 20 may be extended in a transversal direction of the vehicle V and include a fluid tube 210 in which fluid is stored. The pressure sensor 20 may detect fluid pressure P in the fluid tube 210 to detect the pressure applied to the vehicle during a vehicle collision.

The inertia sensor 30 is a sensor detecting a change in vehicle speed, i.e., detecting acceleration.

The first collision determination part 11 may receive a relative distance, relative speed and a relative position between the collision object detected by the active sensor 10 and the vehicle, and a type of the object, and may determine whether the vehicle collides or not on the basis of vehicle speed and acceleration/deceleration information.

Determining a collision performed by the first collision determination part 11 may be performed while using a collision determination algorithm that is performed for the object by using the active sensor 10 in a general airbag system.

The second collision determination part 21 may use pressure metrics created based on the information measured by the pressure sensor 20 to determine whether the vehicle collides or not on the basis of a change in applied pressure.

Figure 4:
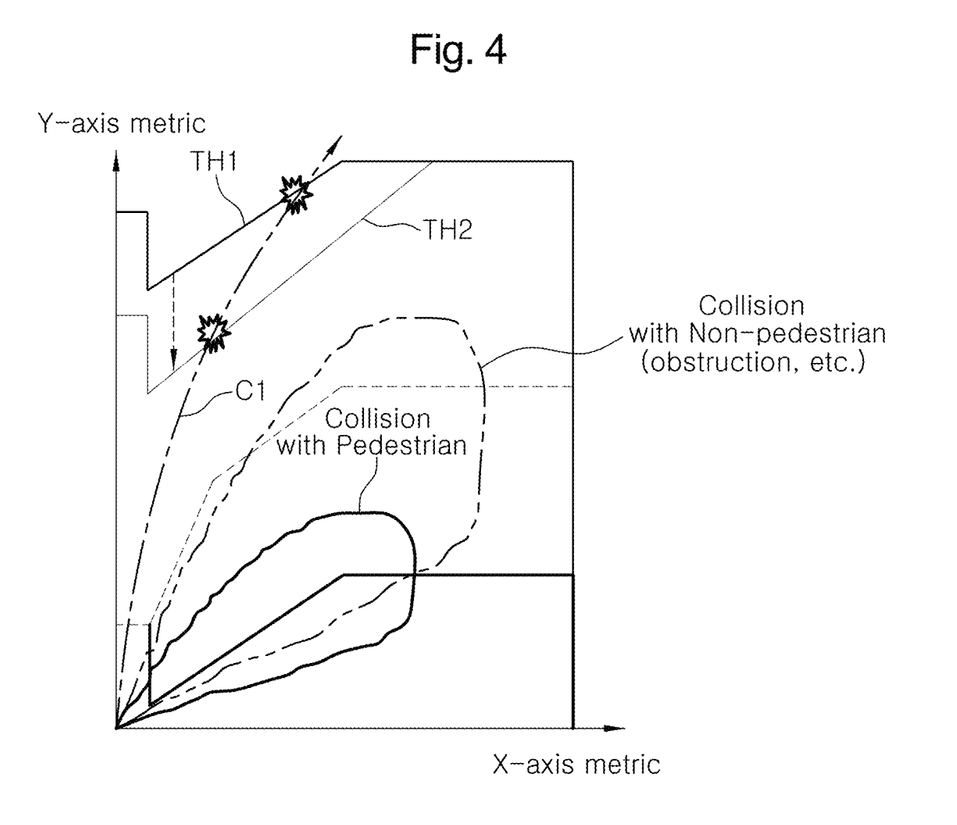
FIG. 4 is a view showing metrics based on information detected by the pressure sensor of the airbag deployment apparatus according to the embodiment of the present invention.

FIG. 4 is a view showing metrics based on information detected by the pressure sensor of the airbag deployment apparatus according to the embodiment of the present invention.

As shown in FIG. 4, the second collision determination part 21 may create metrics with an x-axis taken as an accumulative value of accumulating the pressure detected by the pressure sensor 20 by a preset number and a y-axis taken as the pressure detected by the pressure sensor 20.

When the first collision determination part 11 determines that a vehicle collision occurs, the second collision determination part 21 may change a first threshold TH1 preset for determining whether the vehicle collides or not as a second threshold TH2 less than the first threshold TH1.

The first threshold TH1 is a threshold value for determining whether a vehicle collision occurs or not when the collision determination result performed by the first collision determination part 11 on the basis of the information detected by the active sensor 10 are not present. The second threshold TH2 is a threshold value for determining additionally whether a vehicle collision occurs or not when the first collision determination part 11 determines that a vehicle collision occurs.

As shown in FIG. 4, when the first threshold TH1 and the second threshold TH2 are used in a metric Cl in a vehicle collision, in a case of adopting the second threshold TH2, the collision determination may be performed at a relationship between relatively lower pressures. When the first collision determination part 11 determines that a vehicle collision occurs, the second collision determination part 21 reduces a threshold value for the collision determination, so that the collision determination may be relatively and rapidly confirmed.

The operation of the second collision determination part 21 may compensate for an error in the collision determination for airbag deployment by only the information detected by the pressure sensor 20. As the time required for the collision determination may be reduced, the time at which a seat-mounted airbag is deployed is shortened even faster.

The third collision determination part 31 may determine additionally whether a vehicle collision occurs or not on the basis of the collision determination result that are performed by the first collision determination part 11 on the basis of the information detected by the active sensor 10, the collision determination result performed by the second collision determination part 21 on the basis of the information detected by the pressure sensor 20, and acceleration information detected by the inertia sensor 30.

Figure 5:
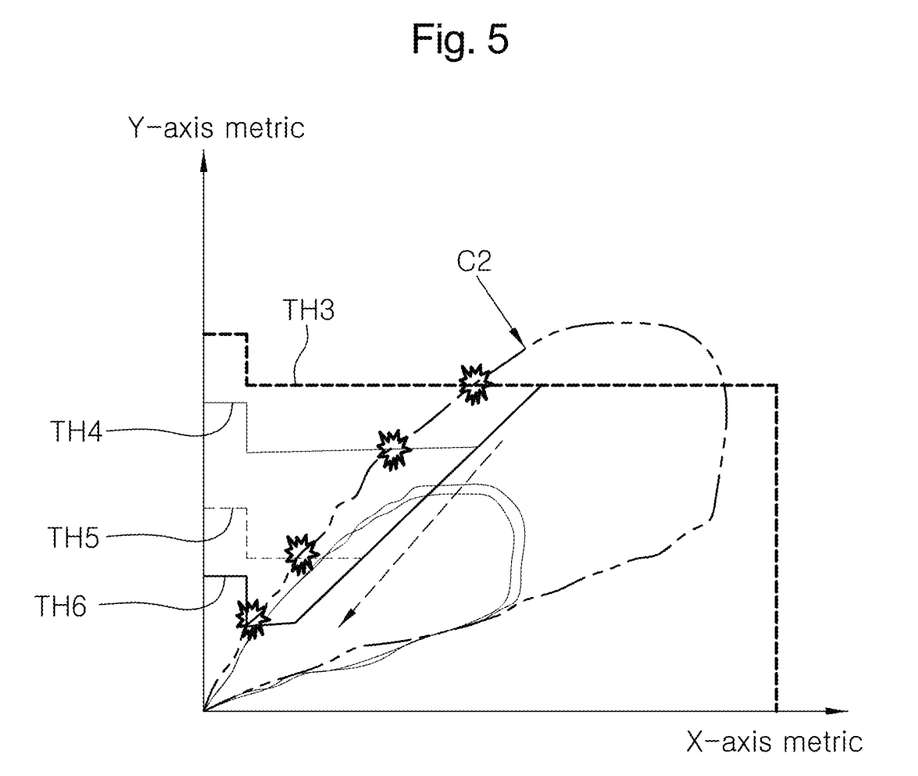
FIG. 5 is a view showing metrics based on information detected by an inertia sensor of the airbag deployment apparatus according to the embodiment of the present invention.

FIG. 5 is a view showing metrics based on information detected by an inertia sensor of the airbag deployment apparatus according to the embodiment of the present invention.

As shown in FIG. 5, the third collision determination part 31 may create metrics with a x-axis taken as distance information obtained by integrating the acceleration information detected by the inertia sensor 30 twice and a y-axis taken as speed information obtained by integrating the acceleration information once.

When the first collision determination part 11 or the second collision determination part 21 determine that a vehicle collision occurs, the third collision determination part 31 may change a third threshold TH3 preset for determining whether a vehicle collision occurs or not as fourth to sixth thresholds TH4 to TH6 having a value less than the third threshold TH3.

The third threshold TH3 is a threshold value for determining whether a vehicle collision occurs or not when neither the collision determination result of the first collision determination part 11 on the basis of the information detected by the active sensor 10 nor the collision determination result of the second collision determination part 21 on the basis of the information detected by the pressure sensor 20 are present. A fourth threshold TH4 is a threshold value used when the first collision determination part 11 determines that a vehicle collision occurs and the second collision determination part 21 determines that a vehicle collision does not occur. A fifth threshold TH5 is a threshold value used when the first collision determination part 11 determines that a vehicle collision does not occur and the second collision determination part 21 determines that a vehicle collision occurs. A sixth threshold TH6 is a threshold value used when the first collision determination part 111 and the second collision determination part 21 determine that a vehicle collision occurs.

The fourth threshold TH4 may be less than the third threshold TH3, and the fifth threshold TH5 may be less than the fourth threshold TH4, and the sixth threshold TH6 may be less than the fifth threshold TH5.

As the threshold values are set as described above, the third collision determination part 31 may most rapidly determine that a vehicle collision occurs by using the smallest threshold value when the first collision determination part 11 and the second collision determination part 21 determine that a vehicle collision occurs. When the first collision determination part 11 and the second collision determination part 21 determine that a vehicle collision does not occur, the third collision determination part 31 may most slowly determine that a vehicle collision occurs.

When the first collision determination part 11 and the second collision determination part 21 determine that a vehicle collision occurs, the probability of collision is highest in this case, so that the third collision determination part 31 may rapidly determine whether a collision occurs or not by using the smallest threshold value. When at least one of the first collision determination part 11 and the second collision determination part 21 determines that a vehicle collision does not occur, the probability of collision is relatively low in this case, so that the third collision determination part 31 may strictly determine whether a collision occurs or not by using a greater threshold value, and thus preventing mis-determination of collision.

When the collision determination of the third collision determination part 31 is performed, the airbag deployment determination part 50 outputs an airbag deployment signal to an airbag driving circuit 60 so that the airbag is deployed.

As described above, the airbag used in the airbag deployment apparatus according to the embodiment of the present invention is a seat-mounted airbag 71 provided in the seat and configured to be deployed from the rear of an occupant on the seat in a forward direction. Further, a front airbag 72 configured to be deployed from the front of the occupant toward the occupant is provided in front of the seat in the vehicle in addition to the seat-mounted airbag 71, so when the seat-mounted airbag 71 and the front airbag 72 are deployed together, interference therebetween may occur to generate a disadvantage in the safety of occupant.

In order to solve the above problem, the airbag deployment apparatus according to the embodiment of the present invention may include the seat position sensor 40 to detect a seat position, so that the deployment time of the front airbag 72 may be controlled on the basis of the results of the detection.

The airbag deployment determination part 50 may determine whether the seat-mounted airbag 71 and a front airbag 72 occur or not on the basis of an area to which seat position information output from the seat position sensor 40 of FIG. 1 belongs. The seat position sensor 40 may be a camera or an infrared distance sensor provided in the interior of the vehicle and capable of detecting an installation position of the front airbag and a distance between the front airbag and the seat.

The airbag deployment determination part 50 may not deploy the seat-mounted airbag 71 when the seat position is located close to the installation position of the front airbag 72 to be shorter than a preset seventh threshold TH7. The seventh threshold TH7 may be a threshold value used to determine that the time required for a front chamber of the seat-mounted airbag 71 to be located to the front of the occupant may not be sufficiently protected from collision impact, even when the seat-mounted airbag 71 is rapidly deployed as the seat position is closer to the installation position of the front airbag 72.

In addition, when the seat position is spaced apart from the installation position of the front airbag 72 by a distance equal to or longer than the preset seventh threshold TH7 and is located close thereto to be shorter than an eighth threshold TH8, the airbag deployment determination part 50 deploys the seat-mounted airbag 71 first and then deploys the front airbag 72 of which deployment is delayed, or when necessary, deploys the front airbag 72 while reducing pressure of the front airbag 72, whereby interference between the seat-mounted airbag 71 and the front airbag 72 is prevented.

In addition, when the seat position of the front airbag 72 is spaced apart from the installation position of the front airbag 72 by a distance equal to or longer than the preset eighth threshold TH8, the seat-mounted airbag 71 and the front airbag 72 may be deployed on the basis of the deployment determination results, respectively. The eighth threshold TH8 may be a distance in which, even when both the seat-mounted airbag 71 and the front airbag 72 are deployed respectively, interference therebetween may not occur.

Figure 6:
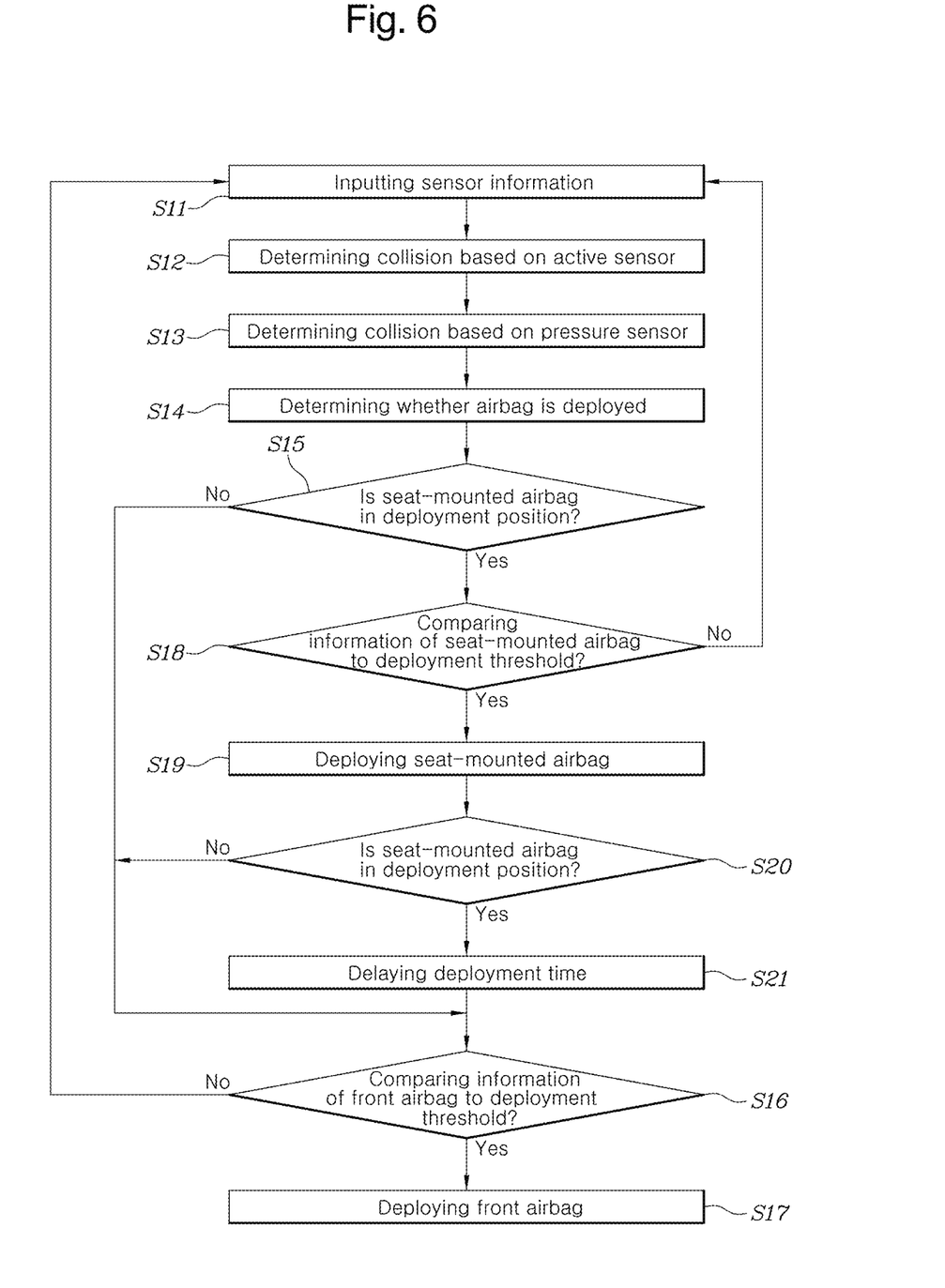
FIG. 6 is a flowchart showing an airbag deployment method according to an embodiment of the present invention.

FIG. 6 is a flowchart showing an airbag deployment method according to an embodiment of the present invention.

Referring to FIG. 6, an airbag deployment method according an embodiment of the present invention includes: inputting the information from the active sensor 10, the pressure sensor 20, and the inertia sensor 30 (S11); determining a collision, in which the first collision determination part 11 determines whether a collision occurs or not on the basis of the information input from the active sensor 10 (S12); additionally determining a collision, in which the second collision determination part 21 determines whether a collision occurs or not on the basis of the pressure information input from the pressure sensor 20 and the collision determination result of the first collision determination part 11 (S13); and additionally determining whether a collision occurs or not, in which the third collision determination part 31 additionally determines whether a collision occurs or not on the basis of the information input from the inertia sensor 30 and the collision determination results performed by both the first collision determination part 11 and the second collision determination part 21 (S14).

In addition, the airbag deployment method according to the embodiment of the present invention includes: determining by the airbag deployment determination part 50 whether the seat-mounted airbag 71 is deployed or not, in comparison of the seat position input from the seat position sensor 40 to the seventh threshold TH7 (S15). When the seat position is not located on the deployment position of the seat-mounted airbag 71, the information about the deployment of the front airbag 72 is compared to the preset threshold value (S16), and then the front airbag 72 may be deployed on the basis of the comparison result (S17).

Meanwhile, in S15, when the airbag deployment determination part 50 determines that the seat position is in the deployment position of the seat-mounted airbag 71, the airbag deployment determination part 50 may deploy the seat-mounted airbag 71 as the third collision determination part 31 determines that a collision occurs in S14.

Then, the airbag deployment determination part 50 determines whether the front airbag 72 is deployed while being delayed by comparing the seat position information input from the seat position sensor 40 to the eighth threshold TH8 S20. When the seat position is closer to the installation position to be shorter than the eighth threshold TH8, the airbag deployment determination part 50 may delay the deployment time S21, and then the front airbag 72 may be deployed in S17 in response to the deployment determination result (S16) of the front airbag 72. In S20, when the seat position is spaced apart from the installation position of the front airbag by a distance equal to or longer than the eighth threshold TH8, the airbag deployment determination part 50 may deploy the front airbag 72 in S17 without a delay in response to the deployment determination result (S16) of the front airbag 72.

As described above, the airbag deployment apparatus and the airbag deployment method according to the various embodiments of the present invention can rapidly perform airbag deployment by adjusting the threshold values used to determine whether a collision occurs or not by correlating the information detected by the various sensors capable of determining whether a collision occurs or not. In addition, mis-deployment of the airbag in which the airbag is deployed even when airbag deployment is unnecessary can be prevented.

The airbag deployment apparatus and the airbag deployment method according to the various embodiments of the present invention can prevent interference caused between the seat-mounted airbag protecting an occupant and the front airbag deployed front the front of the seat toward the occupant when both the seat-mounted airbag and the front airbag are operated.

Therefore, the airbag deployment apparatus and the airbag deployment method according to the various embodiments of the present invention can improve the safety of the occupant by efficiently protecting the vehicle occupant when a vehicle collision occurs.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An airbag deployment apparatus comprising:
    an active sensor configured to detect at least one type of information among a distance, a speed, a position, and a type of a collision object to a vehicle;
    a pressure sensor configured to detect pressure applied to the vehicle during a collision of the vehicle;
    an inertia sensor configured to detect acceleration of the vehicle;
    a first collision determination part configured to determine whether a vehicle collision occurs or not bases on information detected by the active sensor;
    a second collision determination part configured to additionally determine whether a vehicle collision occurs or not based on pressure information detected by the pressure sensor and collision determination a result performed by the first collision determination part;
    a third collision determination part configured to additionally determine whether a vehicle collision occurs or not based on acceleration information of the vehicle detected by the inertia sensor and collision determination results performed by both the first collision determination part and the second collision determination part; and
    an airbag deployment determination part configured to determine whether an airbag is deployed or not based on collision determination a result performed by the third collision determination part.

2. The airbag deployment apparatus of claim 1, wherein the first collision determination part is configured to receive a relative distance, a relative speed, and a relative position between the collision object and the vehicle, and the type of the collision object, which are detected by the active sensor, and to determine whether the vehicle collides with the collision object or not based on the speed and acceleration/deceleration information of the vehicle.

3. The airbag deployment apparatus of claim 1, wherein the second collision determination part is configured to create accumulative pressure-pressure metrics based on the information detected by the pressure sensor, and
    when the first collision determination part determines that the vehicle does not collide, the second collision determination part determines whether a vehicle collision occurs or not based on a result obtained by comparing a preset first threshold and the accumulative pressure-pressure metrics, and when the first collision determination part determines that the vehicle collides, the second collision determination part determines whether a vehicle collision occurs or not based on a result obtained by comparing a second threshold less than the first threshold and the accumulative pressure-pressure metrics.

4. The airbag deployment apparatus of claim 1, wherein the third collision determination part is configured to create distance-speed metrics based on the information detected by the inertia sensor, and to determine whether a vehicle collision occurs or not by comparing the distance-speed metrics to a preset threshold, and to change the preset threshold used in the collision determination based on the collision determination results of both the first collision determination part and the second collision determination part.

5. The airbag deployment apparatus of claim 4, wherein, when the collision determination results of the first collision determination part and the second collision determination part are not present, the third collision determination part determines whether a vehicle collision occurs or not by comparing accumulative pressure-pressure metrics and a third threshold,
    when the first collision determination part determines that a vehicle collision occurs and the second collision determination part determines that a vehicle collision does not occur, the third collision determination part determines whether a vehicle collision occurs or not by comparing a fourth threshold less than the third threshold and the accumulative pressure-pressure metrics,
    when the first collision determination part determines that a vehicle collision does not occur and the second collision determination part determines that a vehicle collision occurs, the third collision determination part determines whether a vehicle collision occurs or not by comparing a fifth threshold less than the fourth threshold and the accumulative pressure-pressure metrics, and
    when both the first collision determination part and the second collision determination part determine that a vehicle collision occurs, the third collision determination part determines whether a vehicle collision occurs or not by comparing a sixth threshold less than the fifth threshold and the accumulative pressure-pressure metrics.

6. The airbag deployment apparatus of claim 1, wherein the airbag is a seat-mounted airbag provided at a seat of the vehicle and configured to be deployed forward from a rear side of an occupant on the seat.

7. The airbag deployment apparatus of claim 6, further comprising:
    a front airbag provided in front of the seat and configured to be deployed from the front of the occupant on the seat toward the occupant; and
    a seat position sensor configured to detect a distance between an installation position of the front airbag and the seat.

8. The airbag deployment apparatus of claim 7, wherein when a position of the seat is located close to the installation position of the front airbag to be shorter than a preset seventh threshold, the airbag deployment determination part does not deploy the seat-mounted airbag.

9. The airbag deployment apparatus of claim 8, wherein when the position of the seat is spaced apart from the installation position of the front airbag by a distance equal to or longer than the preset seventh threshold and is closer thereto to be shorter than an eighth threshold greater than the seventh threshold, the airbag deployment determination part deploys the seat-mounted airbag first and then deploys the front airbag with time of delay.

10. The airbag deployment apparatus of claim 9, wherein when the seat position is spaced apart from the installation position of the front airbag by a distance equal to longer than the eighth threshold, the airbag deployment determination part deploys the seat-mounted airbag and the front airbag, separately.

11. An airbag deployment method comprising:
inputting information from an active sensor configured to detect at least one type of information among a distance, a speed, a position, and a type of a collision object to a vehicle, information from a pressure sensor configured to detect pressure applied to the vehicle during a vehicle collision, and information from an inertia sensor configured to detect acceleration of the vehicle;
first collision-determining, wherein a first collision determination part determines whether a vehicle collision occurs or not based on information detected by the active sensor;
second collision-determining, wherein a second collision determination part additionally determines whether a vehicle collision occurs or not based on pressure information detected by the pressure sensor and a collision determination result of the first collision determination part;
third collision-determining, wherein a third collision determination part additionally determines whether a vehicle collision occurs or not based on acceleration information detected by the inertia sensor, and collision determination results performed in both the first collision-determining and the second collision-determining; and
determining, wherein an airbag deployment determination part determines whether an airbag is deployed or not based on a collision determination result performed in the third collision-determining.

12. The airbag deployment method of claim 11, wherein in the first collision-determination, the first collision determination part receives a relative distance, a relative speed, and a relative position between the collision object and the vehicle, and a type of the collision object, which are detected by the active sensor, and determines whether the vehicle collides with the collision object or not based on the speed and acceleration/deceleration information of the vehicle.

13. The airbag deployment method of claim 11, wherein in the second collision-determining, the first collision determination part creates accumulative pressure-pressure metrics based on the information detected by the pressure sensor, and
when the first collision determination part determines that a vehicle collision does not occur in the first collision-determining, the second collision determination part determines whether a vehicle collision occurs or not based on results obtained by comparing a preset first threshold and the accumulative pressure-pressure metrics, and when the first collision determination part determines that a vehicle collision occurs in the first collision-determining, the second collision determination part determines whether a vehicle collision occurs or not based on results obtained by comparing a second threshold less than the first threshold and the accumulative pressure-pressure metrics.

14. The airbag deployment method of claim 11, wherein in the third collision-determining, the third collision determination part creates distance-speed metrics based on the information detected by the inertia sensor, and determines whether a vehicle collision occurs or not by comparing the distance-speed metrics to a preset threshold, and changes the preset threshold used in the collision determination based on the collision determination results of both the first collision determination part and the second collision determination part.

15. The airbag deployment method of claim 14, wherein in the third collision-determining, when the collision determination results in the first collision-determining and the second collision-determining are not present, the third collision determination part determines whether a vehicle collision occurs or not by comparing the accumulative pressure-pressure metrics and a third threshold,
when the first collision determination part determines that a vehicle collision occurs in the first collision-determining and the second collision determination part determines that a vehicle collision does not occur in the second collision-determining, the third collision determination part determines whether a vehicle collision occurs or not by comparing a fourth threshold less than the third threshold and the accumulative pressure-pressure metrics,
when the first collision determination part determines that a vehicle collision does not occur in the first collision-determining and the second collision determination part determines that a vehicle collision occurs in the second collision-determining, the third collision determination part determines whether a vehicle collision occurs or not by comparing a fifth threshold less than the fourth threshold and the accumulative pressure-pressure metrics, and
when both the first collision determination part and the second collision determination part determine that a vehicle collision occurs in the first collision-determining and the second collision-determining, the third collision determination part determines whether a vehicle collision occurs or not by comparing a sixth threshold less than the fifth threshold and the accumulative pressure-pressure metrics.

16. The airbag deployment method of claim 11, wherein the airbag is a seat-mounted airbag provided at a seat of the vehicle and configured to be deployed forward from a rear side of an occupant on the seat.

17. The airbag deployment method of claim 16, wherein the vehicle comprises: a front airbag provided in front of the seat and configured to be deployed from the front of the occupant on the seat toward the occupant; and a seat position sensor configured to detect a distance between an installation position of the front airbag and the seat, and
in the determining of airbag deployment, when a position of the seat is closer to the installation position of the front airbag to be shorter than a preset seventh threshold, the airbag deployment determination part determines not to deploy the seat-mounted airbag.

18. The airbag deployment method of claim 17, wherein in the determining of airbag deployment, when the position of the seat is spaced apart from the installation position of the front airbag by a distance equal to or longer than the present seventh threshold and is closer thereto an eighth threshold greater than the seventh threshold, the airbag deployment determination part determines to deploy the seat-mounted airbag first and then to deploy the front airbag with time of delay.

19. The airbag deployment method of claim 18, wherein in the determining of airbag deployment, when the position of the seat is spaced apart from the installation position of the front airbag by a distance equal to or longer than the eighth threshold, the airbag deployment determination part deploys both the seat-mounted airbag and the front airbag.

\* \* \* \* \*